(No Model.) 4 Sheets—Sheet 2.
G. G. PRENTICE.
MULTIPLE SCREW MACHINE.
No. 574,163. Patented Dec. 29, 1896.
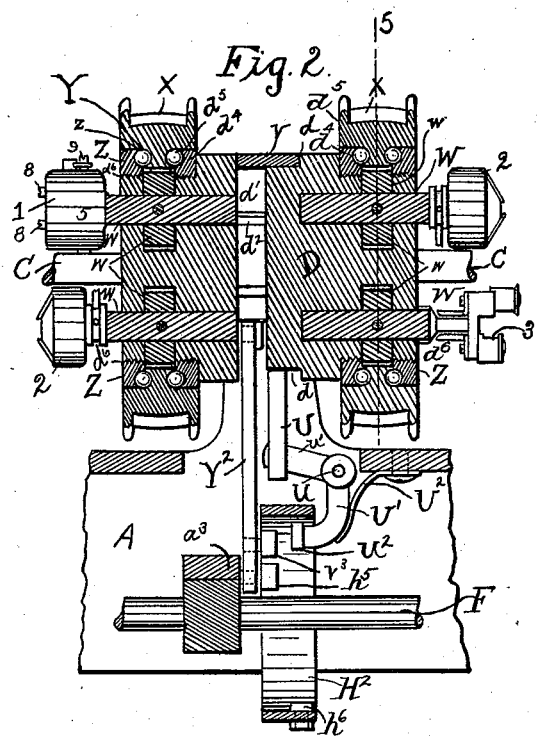
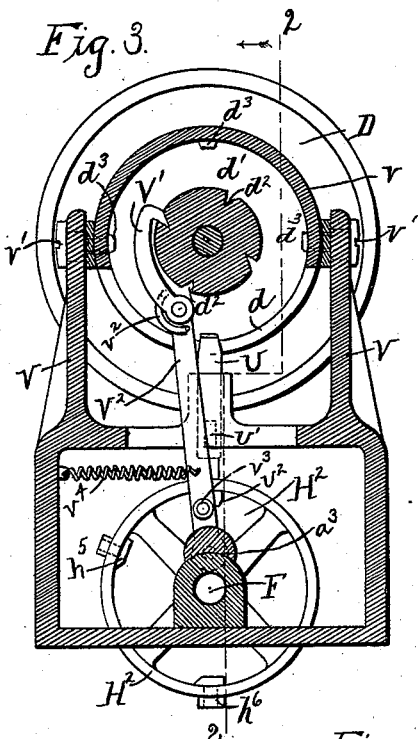
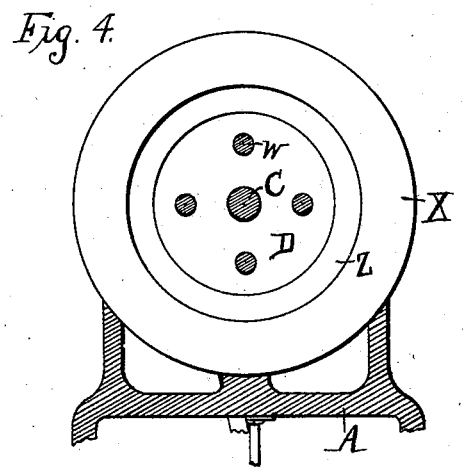
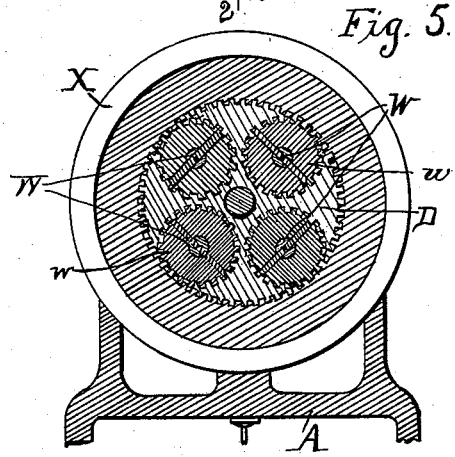
WITNESSES:
INVENTOR
George G. Prentice
BY Robinson Fisher
his ATTORNEYS (No Model.) 4 Sheets—Sheet 3.

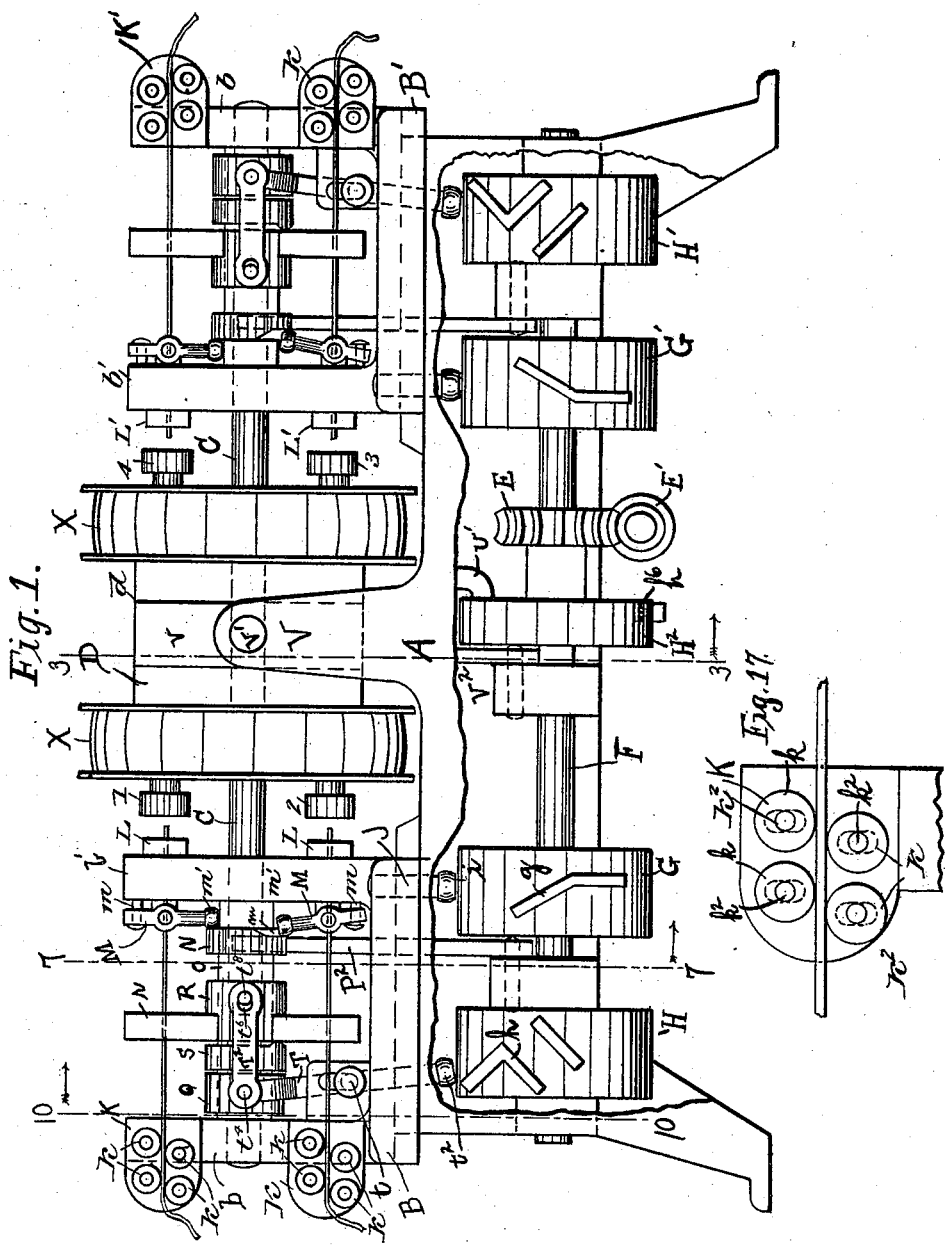

G. G. PRENTICE.
MULTIPLE SCREW MACHINE.

No. 574,163. Patented Dec. 29, 1896.

WITNESSES:
F. Philip Farnsworth.
T. H. Callahan.

INVENTOR
George G. Prentice
BY Robinson & Fisher
his ATTORNEYS (No Model.) 4 Sheets—Sheet 4.

G. G. PRENTICE.
MULTIPLE SCREW MACHINE.

No. 574,163. Patented Dec. 29, 1896.

WITNESSES:

INVENTOR
George G. Prentice
BY Robinson Fisher
his ATTORNEYS

UNITED STATES PATENT OFFICE.

GEORGE G. PRENTICE, OF NEW YORK, N. Y.

MULTIPLE SCREW-MACHINE.

SPECIFICATION forming part of Letters Patent No. 574,163, dated December 29, 1896.

Application filed August 2, 1895. Serial No. 558,021. (No model.)

*To all whom it may concern:*

Be it known that I, GEORGE G. PRENTICE, a citizen of the United States, and a resident of the city, county, and State of New York, have invented a new and useful Improvement in Wire Multiple Screw-Machines, which is fully set forth and described in the following specification, taken in connection with the drawings which form a part thereof, and in which like letters and numerals of reference represent like parts in all figures.

Figure 6:
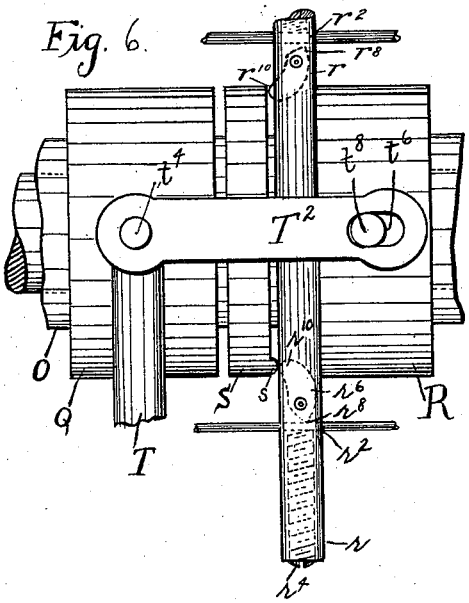
Figure 7:
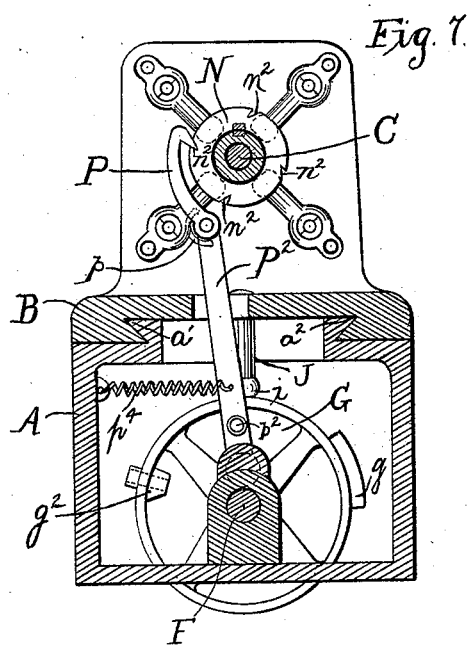
Figure 8:
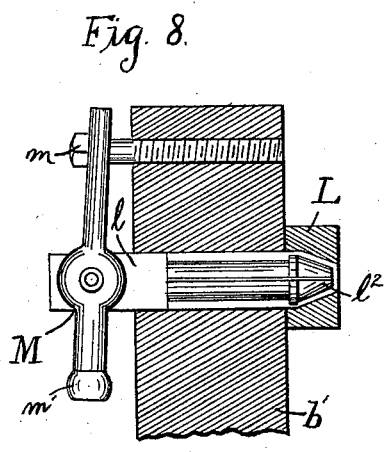
Figure 9:
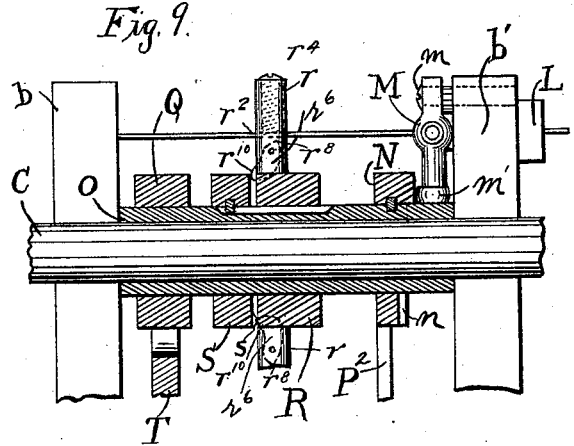
Figure 10:
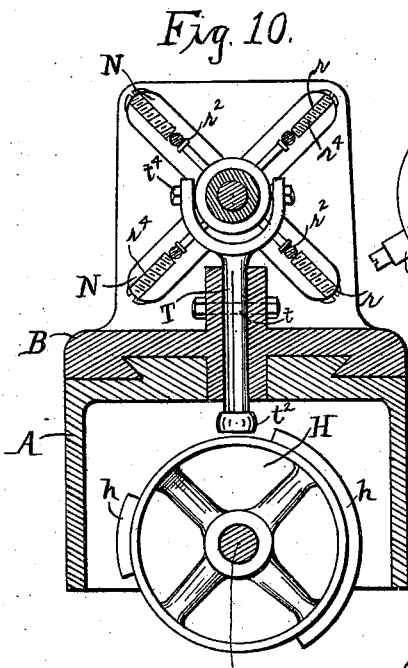
Figures 11, 12:
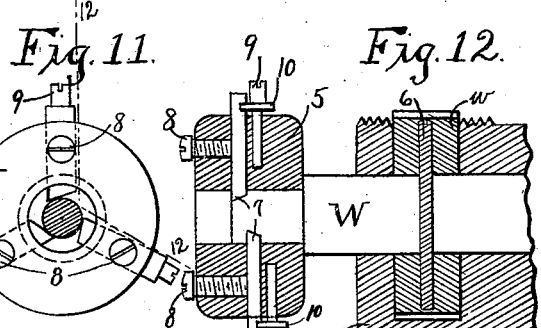
Figure 13:
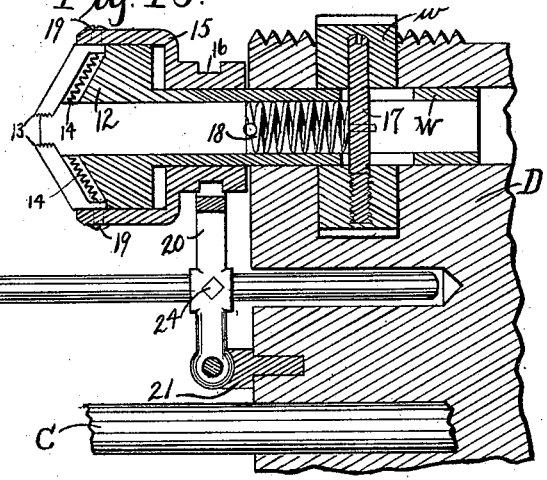
Figure 14:
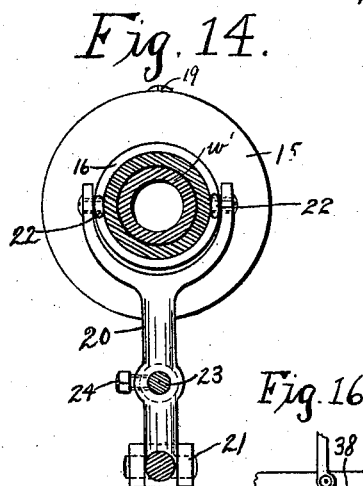
Figure 15:
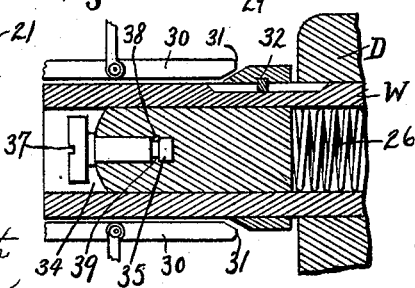
Figure 16:
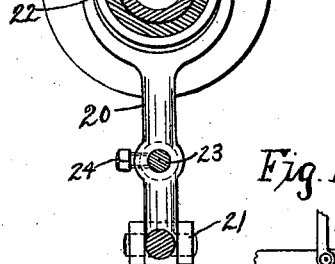

Figure 1 is a front elevation of a machine, partly broken away, embodying my invention; Fig. 2, a longitudinal section through the tool-holder and associated parts on line 2 2 of Fig. 3; Fig. 3, a transverse vertical section on line 3 3 of Fig. 1; Fig. 4, an end elevation of the tool-holder; Fig. 5, a transverse vertical section on a central line through the pulleys, line 5, Fig. 2; Fig. 6, a detail view of the feed mechanism; Fig. 7, a transverse vertical section on line 7 7 of Fig. 1; Fig. 8, a detailed view of a chuck and associate parts; Fig. 9, a longitudinal central section through the rotating sleeve and collars mounted thereon; Fig. 10, a transverse vertical section on line 10 10, Fig. 1; Fig. 11, an end view of the turning-tool; Fig. 12, a sectional view on line 12 12 of Fig. 11; Fig. 13, a central longitudinal section of the threading-tool; Fig. 14, a transverse vertical section through the same; Fig. 15, a view, partly in elevation, partly in section, of the combined nurling and cutting-off tool; Fig. 16, a sectional view of a detail of said tool; Fig. 17, a detail view of the straightening-rollers.

This invention relates to lathes for automatically making screws, commonly called "screw-machines," in which the stock is fed directly from coils of wire through straightening-rollers and suitable feeding device to the tools, and has for its object the construction of a machine having a plurality of revolving tools brought to bear simultaneously upon stock, thereby greatly increasing the capacity and efficiency in producing screws, and of the construction of simple feeding and other mechanisms for a machine of this character, as more fully described and claimed hereinafter.

In the machine embodying this invention and shown in the drawings, A represents the bed of my machine with the ways $a'$ and $a^2$, on which are mounted the reciprocating carriages B and B', each having the uprights $b$ and $b'$. A dead-shaft C extends longitudinally through the said uprights and is journaled to slide longitudinally in the same. The cylindrical turret or tool-holder D, having tools on both ends, is loosely mounted on the shaft C between the two carriages B and B', and is adapted to intermittently rotate about said shaft in a vertical plane.

Power from any suitable driving-shaft is transmitted by means of worm-wheel E and worm E', connected therewith, and rigidly secured to the cam-shaft F, which extends longitudinally through and is journaled in the bed A. Upon the shaft F are the cam-wheels G and G' for reciprocating the carriages B and B' and the cam-wheels H and H' for operating the feeding device and cam-wheel H² for rotating the tool-holder. The cam-wheel G reciprocates the carriage B longitudinally on the lathe-bed A by means of the surface cam $g$, which engages with an antifriction-roller $i$ on the vertical stud J, rigidly secured to said carriage. The stock, which is received from four coils, (not shown,) passes through the four sets of straightening-rollers K on the outer upright $b$ to the four chucks L on the inner upright $b'$. Each set of straightening-rollers K consists of four scored rollers $k$, adjustably mounted by screws $k^2$, Fig. 17, so that they may be adjusted for various sizes of wire.

Each of the chucks L which hold the wire against rotation consists of a cylindrical block on the inner side of the upright $b'$, having a circular opening through its center, into which extends the tapered head $l^2$ of a split collet $l$, Figs. 8 and 9. The collet $l$ projects through the upright $b'$ and has pivoted to its outer end a lever M. Lever M is fulcrumed to the upright $b'$ by means of the screw $m$, and has at its other end an antifriction-roller $m'$ bearing against the inner side of a collar N. The interior of the chucks L is beveled to correspond with the tapering on the head $l^2$ of the split collet $l$, thereby tending to press said collet rearward, forcing the end of lever M in constant contact with the collar N. Collar N is keyed to the sleeve O, loosely mounted on the dead-shaft C, and has on its inner surface an indenture $n$, which on each quarter-revolution of the sleeve O allows the free end of one of the levers M a slight outward movement, sufficient to withdraw the tapered head $l^2$ of the split collet $l$ from engagement in the chuck L, as shown at $l^2$, Fig. 8. While the tapered head $l^2$ is thus withdrawn from engagement in the chuck L the wire is free to be fed forward by feeding mechanism to be described. Upon the continued revolution of sleeve O and collar N the free end of lever M is forced out of the indenture $n$ toward the upright $b'$ and the tapered head $l^2$ of the collet $l$, driven in contact with the beveled interior of the chuck L and the collet $l$, compressed to grip the wire securely.

On the exterior of the collar N are four teeth $n^3$, Fig. 7, corresponding to the four chucks L. A pawl P, pivoted to the oscillating lever $P^2$, is adapted to engage in said teeth under the tension of spring $p$. The oscillating lever $P^2$ is pivoted at its lower end to the bed A, above the cam-shaft F, and has an antifriction-roller $p^2$, adapted to engage with a tripper $g^2$ on the interior of the cam-wheel G upon the revolution of said cam-wheel. When the tripper $g^2$ thus engages the roller $p^2$, it draws the oscillating lever $P^2$ about its center, and the pawl P, connected therewith, revolves the collar N and sleeve O, rigidly secured thereto. As the lever $P^2$ has a center above that of the cam-wheel G when it has been drawn through an arc sufficient to revolve the collar Q one-fourth of a circle the tripper $g^2$ will pass over the roller $p^2$, allowing the lever $P^2$ to swing backward under the tension of a spring $p^4$, connecting it with the bed A. Upon the backward movement of the lever $P^2$ the pawl P will slip about the collar N and engage in the next succeeding tooth $n^2$ therein.

Collars Q and R are loosely mounted on the sleeve O, and a collar S, also mounted on said sleeve, is splined to revolve therewith, but remain capable of an independent longitudinal motion, Fig. 9. Collar R has four arms $r$ projecting transversely therefrom, the ends of which have circular perforations $r^2$, Fig. 10, through which the wire passes from the straightening-rollers K to the chucks L. Binding-screws $r^4$ extend from the ends of the arms $r$ into the perforations $r^2$. Friction-clutches $r^6$, of eccentric shape, are pivoted in said arms, having projections $r^8$ and fingers $r^{10}$. Upon the inner surface of collar S is a lug $s$, which, upon each quarter-revolution of the sleeve O and collar S, is adapted to be brought successively in alinement with the fingers $r^{10}$ in the arms $r$, Fig. 6.

A lever T, adjustably pivoted at $t$ to the carriage B, Figs. 1, 6, and 10, has at its lower end a roller $t^2$ to engage with the surface cams $h$ on cam-wheel H, and is bifurcated at its upper end to surround the collar Q, to which it is secured by screws $t^4$. Short links $T^2$ are pivoted to the screws $t^4$ and have at their other end slots $t^6$, in which the screws $t^8$ on the collar R have a limited play.

When the cams $h$ force the lower end of lever T outward, the upper end forces the collar Q and sleeve O inward in contact with the collar S. As the inward motion of the lever T is not immediately communicated to the collar R, owing to the play of the screw $t^4$ in the slot $t^6$, the lug $s$ on the collar S is brought in contact with the fingers $r^{10}$ in alinement therewith. By the pressure of the lug $s$ on the finger $r^{10}$, Fig. 6, the friction-clutch $r^6$ is turned about its pivot, and the projection $r^8$ grips the wire with the screws $r^4$. The farther inward movement of the collars Q and S is communicated to the collar R and the wire thereupon fed inward.

The particular friction-clutch $r^6$ acted upon by the stud $s$ is in alinement with the chucking device the lever M of which has its head engaged in the indenture $n$ of the collar N. As collar S and sleeve O revolve with collar N the feeding mechanism will be operated on each of the four wires successively while the chucking mechanism is opened. Upon the reverse movement of lever T the collar Q will be drawn outward before the collar R, thereby releasing the pressure of the stud $s$ on the finger $r^{10}$ of the friction-clutch $r^6$, so that the wire may slip easily between said clutch and binding-screw $r^4$.

The turret or tool-holder D, loosely mounted on the dead-shaft C, has on each end tools equal in number to the wires carried by each reciprocating carriage. By this arrangement the tools on each end are brought simultaneously into operation upon stock, and as the two carriages are reciprocated synchronously all the stock is operated upon at the same time. To bring the tools successively into operation upon each wire, the turret carries a complete set of tools on each end and is intermittently rotated on the shaft C.

The method of rotating the turret resembles that described in my application for Letters Patent for a multiple screw-machine, filed April 11, 1895, Serial No. 550,660.

On the bed A of the machine are two lateral uprights V, having a semicircular band $v$ extending between the two and secured thereto by means of bolts $v'$. The band $v$ is adapted to fit in an annular groove $d$ about the center of the cylindrical surface of the turret D. By this device the turret D is held against longitudinal movement, while free to rotate about the shaft C. In the groove $d$ of the turret D is a narrower deeper groove $d'$, notched at four points $d^2$ to form a dial-wheel, the teeth of which are the notches $d^2$, Figs. 2 and 3. A pawl $V'$, pivoted to the reciprocating lever $V^2$, is held in engagement with the teeth $d^2$ by the spring $v^2$. The lever $V^2$ is pivotally connected to the bed A at the point $a^3$ above the cam-shaft F and has a roller $v^3$, adapted to be brought in contact with the tripper $h^5$ on the interior of the cam-wheel $H^2$ upon the revolution of said wheel. When the tripper $h^5$ engages with the roller $v^3$, it draws the lever $V^2$ about its center and the pawl $V'$ rotates the turret D. When the turret D has been rotated through a quarter of a circle, the tripper $h^5$ will pass above the roller $v^3$, the lever $V^2$ having its center above that of the cam-wheel, and allow the lever $V^2$ to swing backward under the tension of spring $v^4$, connecting the lever and bed. The pawl $V'$ will thereupon slip about the dial-wheel and engage with the next tooth $d^2$.

The turret D is held in its proper alinement and from rotation by means of a lock-bolt U, which is shot into sockets or keepers $d^3$ in the groove $d$. The bolt U is operated by bell-crank lever $U'$, pivoted in the bed at $u$, one end of which extends through a slot $u'$ in the bolt U, the other end carrying a roller $u^2$, adapted to be engaged by a tripper $h^6$ on the interior of the cam-wheel $H^2$ upon the revolution of the same. A spring $U^2$ bears against the lever $U'$, constantly pressing the bolt U into its sockets $d^3$. Immediately prior to the reciprocation of the lever $V^2$ the tripper $h^6$ engages with the roller $u^2$, forcing the end of the lever $U'$ downward and withdrawing the bolt U from its sockets. The tripper $h^6$ having passed over the roller $u^2$, the bolt U is forced into the next succeeding socket by the spring $U^2$ upon the revolution of the turret D.

Journaled in each end of the turret D are short shafts W, which are here shown four in number and are adapted to receive the tools 1, 2, 3, and 4. Upon each shaft W is the pinion $w$, which meshes with the internal gearing of a pulley X, surrounding the same, Figs. 2 and 5. The pulleys X, which are driven by the belting or other mechanism from any suitable counter-shaft, are secured to the turret by means of channel-plates $z$. The turret D has near either end above the short shafts W an annular flange $d^4$, of hard metal, having a beveled outer surface $d^5$. The channel-plates $z$, which are internally screw-threaded to engage with the threads $d^6$ on the turret D, are likewise beveled at $z$ on their inner surfaces. The pulleys X are grooved right angular in cross-section to form channels with the beveled surfaces $d^5$ and $z$ and hold therein steel balls Y, which form ball-bearings for said pulleys. The channel-plates $z$ may be easily adjusted to compensate for any wear, and the tools, pinions, and pulleys may be removed by merely unscrewing the channel-plates. The number of short shafts $w$ is adapted to correspond to the number of wires presented by the reciprocating carriage. This number, as well as the method of driving the pulleys X, may vary, although the construction herein shown is preferred.

The tools in turret D may resemble substantially the tools shown in my application above cited with such modifications as may be necessary or advisable to adapt them to a machine of this description, wherein the tools are revolved and the stock is held rigid.

Tool 1 (shown in Figs. 11 and 12) is a turning-tool consisting of a head 5, rigidly attached to the shank or short shaft W. The head has extending transversely therein the three tools 7, which are held in place by longitudinal screws 8 and adjusted by transverse screws 9, having small disks 10 engaging in grooves in the tools. The shank W is adapted to fit within one of the pinions $w$, to which it is rigidly secured by a transverse screw 6 within said pinion. The rotary movement of the pulley X is thereby transmitted to the tool-head 5.

The threading-tool 2 consists of the hollow head 12, rigidly secured to the shank or short shaft W, connected to the pinion $w$ in a similar manner to the tool 1. In the head 12 are placed the two threading-dies 13, adapted to slide therein at an angle to the perpendicular equivalent to the pitch of the thread to be cut upon the stock. Coil-springs 14 in said head constantly tend to force said dies away from the center. Surrounding the lateral surface of the head 12 and extending about a portion of the shank W is a hollow sleeve 15, having the annular groove 16 about that portion surrounding the shank W. This sleeve 15 is adapted to rotate or revolve with the head 12, but is capable of longitudinal movement independent thereof. The shank W is slotted vertically to permit of a limited longitudinal play about the screw 17, securing it to the pinion $w$. A coil-spring 18, connected to said shank and screw, tends to draw said shank rearward. When in its rearward position, sleeve 15 is forced by its contact with the turret D to extend over the tool-head 12, as shown in Fig. 13, and press by means of adjustable screws 19 the dies 13 inward against the tension of springs 14. A lever 20, pivoted to a short shaft 21, secured to the turret D, is bifurcated at its other end to surround the sleeve 15 and has rollers 22, adapted to run in the annular groove 16. A horizontal rod 23 is adjustably secured to a lever 20 by means of the screw 24.

The operation of the tool is as follows: Upon the inward movement of the reciprocating carriage B the stock will engage with the dies 13 in the revolving head 12, and as the thread is cut upon stock the engagement of the dies 13 with the stock will draw the head 12 and shank W outward from the turret D against the tension of the spring 18. When the shoulder of the screw is reached, the adjustable rod 23 is adapted to come in contact with the reciprocating carriage B, and by means of the engagement of lever 20 in the annular groove 16 will draw the sleeve 15 inward, relieving the dies from contact with the screws 19. Immediately the springs 14 will force the dies 13 apart, and the head 12, being free from engagement with the stock, will be drawn inward by the spring 18 to again fit within the sleeve 15, ready to act upon the next succeeding stock.

The combined nurling and cutting-off tool 3 (shown in Figs. 15 and 16) is secured to the revolving pinion $w$ by the screw 25, passing through the shank W. The shank W is slotted vertically to allow a limited longitudinal play about the screw 25, and a spring 26, attached to the shank W, bearing against the screw 25, tends to constantly press the shank outward. The head 27, rigidly secured to the shaft W, carries two sliding tool-carriages 28 and 29, dovetailed to slide transversely therein. Levers 30, pivoted to said head, are secured to the tool-carriages 28 and 29 and have their inner ends beveled at 31 to engage with the conical surface of the ring 32, splined to the turret D, surrounding the shank W.

The cutting-off and nurling-rolls are mounted on the sliding carriages 28 and 29 by means of screws 33, and upon the pressure of the head 27 and shank W inward against the tension of spring 26 as the inner ends of levers 30 engage with the conical ring 32 they are forced inward to engage more deeply with the stock. Within the shank W is a longitudinal slot 34, extending through the center thereof and containing a rod 35, secured therein by set-screw 36, so that it may be adjusted for the various lengths of screws to be cut off. At the outer end of rod 35 is a swivel stud-piece 37, adapted to come in contact with the screw as it is being operated upon and to remain stationary therewith while the shank W and contained rod 35 revolve. The stud-piece 37 has a large contact-head with small shoulders and shank to reduce the friction as much as possible and is held against longitudinal movement by the pin 38, extending through the rod 35 and engaging in the annular groove 39 of the stud 37. In the operation of this tool upon the forward movement of the stock to be cut off the end thereof engages with the swivel stud-piece 37 and upon the further movement of the stock forces the shank W inward in the tool-holder and the levers 30 engage with the conical ring 32, forcing the rolls toward the center of the stock, as above described. Immediately upon the severing of the finished screw from the stock, the pressure upon the swivel stud-piece 37 being released, the spring 26 will force the tool outward again, ready to repeat the operation.

The details of construction of this machine may vary somewhat without departing from the spirit of this invention; but

What I claim, and desire to secure by Letters Patent, is—

1. The combination in a screw-machine with a tool-holder having similar tools on opposite sides thereof; of separate devices for holding and feeding stock on opposite sides of said tool-holder, said devices being mounted on reciprocating carriages; and means for reciprocating said carriages, substantially as described.

2. The combination in a screw-machine, with a tool-holder adapted to hold therein revolving tools; of devices on opposite sides of said tool-holder for holding a plurality of parallel lengths of stock; carriages upon which said devices are mounted, adapted to bring the stock into operation with the tools; and means for operating said carriages, substantially as described.

3. In a screw-machine, the combination with a tool-holder adapted to hold revolving tools on two faces thereof; of devices for holding stock against rotation; reciprocating carriages on which said devices are mounted, adapted to bring stock simultaneously into operation with the tools on the two sides of said tool-holder; and means for operating said carriages, substantially as described.

4. A multiple screw-machine, consisting of a turret having a set of revolving tools on opposite sides thereof; devices for holding stock against rotation; two carriages on which said devices are mounted on opposite sides of said turret, said carriages being adapted to reciprocate synchronously to bring the stock into operation simultaneously with said tools; said turret being adapted to rotate to bring the tools of each set successively into operation upon the stock on the carriage on the corresponding side of said turret; and means for operating said carriages and tool-holders, substantially as described.

5. A multiple screw-machine, consisting of a tool-holder with sets of revolving tools on opposite sides thereof; devices for holding stock against rotation; carriages on opposite sides of said tool-holder, upon which said devices are mounted, each device corresponding to a tool; mechanism for feeding stock into each device on a carriage successively; and mechanism for rotating said tool-holders and reciprocating said carriages being operated from the same driving-shaft which operates said feed mechanism, substantially as described.

6. In a screw-machine, the combination with devices for holding stock against rotation; of carriages upon which said devices are mounted; a tool-holder having tools on opposite sides thereof; mechanism for revolving said tools in said tool-holder; means for rotating said tool-holder; and mechanism for bringing said tools into operation with stock on all the carriages simultaneously, substantially as described.

7. In a screw-machine, the combination with devices for holding stock against rotation; of carriages upon which said devices are mounted; a tool-holder mounted between said carriages, and having tools on opposite sides thereof; mechanism for rotating said tool-holder; gearing on each of said tools for revolving the same, driven by mechanism independent of the mechanism for operating said turret; and means for reciprocating said carriages to bring the stock into operation with said tools, substantially as described.

8. In a screw-machine, the combination with devices for holding the stock, against rotation; of reciprocating carriages upon which said devices are mounted; a tool-holder mounted between said carriages, having tools on opposite sides thereof; mechanism for rotating said turret; gearing on each of said tools for revolving the same; pulleys internally geared to mesh with said gearing on tools; channel-plates for securing said pulleys to said tool-holders; and mechanisms for driving said pulleys and reciprocating said carriages, substantially as described.

9. In a screw-machine, the combination with a tool-holder; of tools mounted on shafts in either end thereof; pulleys on said tool-holders capable of an independent rotary movement thereon, being internally geared to mesh with gearing on said shafts; channel-plates for securing said pulleys on said tool-holders; and mechanism for rotating said tool-holders and driving said pulleys, substantially as described.

10. In a screw-machine, the combination with a tool-holder having tools on opposite sides thereof; of reciprocating carriages on opposite sides of said tool-holder; devices for holding stock against rotation, mounted on said carriages; and feeding mechanism mounted on said carriages to feed the stock into each device on either carriage successively; and mechanism for reciprocating said carriages, substantially as described.

11. In a screw-machine, the combination with a tool-holder of a carriage; a plurality of chucks mounted on said carriage, said chucks being internally conically beveled; split collets having conically-tapered heads adapted to engage with said conical beveling in said chucks; levers hinged to said collets, and pivoted to, engage and disengage said collets with said chucks; and mechanism for successively swinging said levers on their pivots, substantially as described.

12. In a screw-machine, the combination with a tool-holder; of a carriage; a plurality of chucks mounted on said carriage, said chucks being internally conically beveled; split collets having heads conically tapered to engage in said internal beveling in said chucks; levers hinged to said collets, and pivoted to engage and disengage said collets with said chucks; a rotary collar mounted on a shaft to come in contact with the free ends of said levers, having an eccentric adapted to swing each lever successively on its pivot; and means for rotating said collar, substantially as described.

13. In a screw-machine, the combination with a carriage, having mounted thereon a plurality of devices for holding stock against rotation; of a collar having feeding mechanism mounted thereon corresponding to each device, said collar being capable of a reciprocating movement; means for operating each feeding mechanism successively; and mechanism for reciprocating said collar, substantially as described.

14. In a screw-machine, the combination with a carriage, having mounted thereon a plurality of devices for holding stock against rotation, of a reciprocating collar having arms corresponding to each of said devices; friction-clutches mounted on said arms being adapted to be turned about their center; mechanism for reciprocating said collar; and means for operating said friction-clutches successively on the forward movement of said collar, substantially as described.

15. In a screw-machine, the combination with a carriage having mounted thereon a plurality of devices for holding stock against rotation; of a reciprocating collar mounted on a shaft on said lathe, having arms corresponding to each of said devices; feed mechanism on said arms; a supplementary collar on said shaft, capable of a rotary movement, having thereon an eccentric adapted to operate said mechanism on said arms successively; and mechanisms for reciprocating said collar and rotating said supplementary collar, substantially as described.

16. In a screw-machine, the combination with a plurality of devices for holding stock against rotation; of a reciprocating collar having arms in alinement with each of said devices; feed mechanism on said arms; a supplementary collar, capable of an intermittent rotary movement and a reciprocating movement; an eccentric on said supplementary collar for operating the mechanism on said arms; a lever pivoted to reciprocate said collars; and means for rotating said supplementary collar independent of said lever to bring the eccentric thereon in alinement with each arm successively, substantially as described.

17. In a screw-machine, the combination with a tool-holder; of a head having threading-dies mounted thereon; a shank capable of a revolving and longitudinal movement in said tool-holder; a spring constantly tending to draw said head and shank inward to said tool-holder; a sleeve surrounding said head and shank, and adapted to engage with said dies to force them toward the center; and a lever pivoted to said tool-holder and connected to said sleeve, allowing the same an independent rotary movement, while controlling its longitudinal movement; and means for revolving said shank, substantially as described.

18. In a screw-machine, the combination with a tool-holder; of a shaft capable of a revolving and limited longitudinal movement therein; a forked head having a plurality of tool-carriages adapted to slide transversely therein; means for communicating to said carriages their transverse movement upon the rearward movement of said shaft; a stud-piece having swiveling connections with said shaft, adapted to come in contact with the stock and force said shaft rearward; and mechanism for rotating said shaft, substantially as described.

19. A multiple screw-machine, consisting of a plurality of devices for holding stock against rotation; a reciprocating carriage on which said devices are mounted; a tool-holder having revolving tools on one end corresponding to the number of holding devices on said carriage, and capable of an intermittent rotary motion on a horizontal axis to bring each tool successively into operation with the stock in each of said devices, and all the tools simultaneously into operation on stock; and mechanism for revolving said tools, reciprocating said carriage, and rotating said tool-holder, substantially as described.

20. A multiple screw-machine, consisting of a plurality of devices for holding stock against rotation; a reciprocating carriage on which said devices are mounted; mechanism for feeding stock into each of said devices successively; a tool-holder having revolving tools on one end corresponding to the number of holding devices on said carriage, and capable of an intermittent rotary movement on a horizontal axis to bring each tool successively into operation with the stock in each of said devices, and all the tools simultaneously into operation upon stock; and mechanisms for revolving said tools, reciprocating said carriage, and rotating said tool-holder, substantially as described.

21. In a screw-machine the combination with a tool-holder; of shafts on which tools may be mounted; a pulley surrounding said shafts being internally geared to mesh with gears on said shafts; and an adjustable plate mounted on said tool-holders, substantially as described.

22. In a screw-machine the combination with a tool-holder having an annular flange thereon; an adjustable plate adapted to be mounted on said tool-holder; a pulley mounted on said tool-holder and plate; and revoluble shafts on which tools may be mounted, having gearing meshing with gearing on the interior of said pulley, substantially as described.

In witness whereof I have hereunto set my hand this 30th day of July, 1895.

GEORGE G. PRENTICE.

Witnesses:
JANET E. PRENTICE,
JUNE S. STIRLING.